United States Patent [19]

Artz et al.

[11] Patent Number: 4,673,528

[45] Date of Patent: Jun. 16, 1987

[54] SOLID $H_2/D_2$ GAS GENERATORS

[75] Inventors: Glen D. Artz, Portola; Louis R. Grant, Los Angeles, both of Calif.

[73] Assignee: The United States of America as represented by the Secretary of the Army, Washington, D.C.

[21] Appl. No.: 781,820

[22] Filed: Sep. 30, 1985

[51] Int. Cl.[4] .................... C01B 3/04; C06B 27/00
[52] U.S. Cl. ....................... 252/188.25; 149/22; 149/109.2; 252/188.26; 423/648 R; 423/648 A
[58] Field of Search ................. 252/188.25, 188.26; 423/648 A, 648 R; 149/22, 37, 44, 87, 109.2, 119

[56] References Cited

U.S. PATENT DOCUMENTS

| | | | |
|---|---|---|---|
| 3,108,431 | 10/1963 | Armstrong et al. | 423/648 X |
| 3,666,672 | 5/1972 | Hiltz | 252/188.25 X |
| 3,814,694 | 6/1974 | Klager et al. | 252/188.26 X |
| 3,940,474 | 2/1976 | Huskins et al. | 423/648 R |
| 3,948,699 | 4/1976 | Ayers et al. | 423/648 R X |
| 3,948,700 | 4/1976 | Ayers et al. | 149/109.2 |
| 4,000,022 | 12/1976 | Beckert et al. | 149/37 X |
| 4,061,512 | 12/1977 | Chew et al. | 252/188.25 X |
| 4,064,225 | 12/1977 | Chew et al. | 423/648 R |
| 4,157,927 | 6/1979 | Chew et al. | 423/648 R X |
| 4,381,206 | 4/1983 | Grant et al. | 149/22 |

*Primary Examiner*—John F. Terapane
*Assistant Examiner*—Virginia B. Caress
*Attorney, Agent, or Firm*—John C. Garvin, Jr.; Freddie M. Bush

[57] ABSTRACT

A solid fuel for generating $H_2$ or $D_2$ gases, comprising magnesium borohydride diammoniate (MBDA) or its deuterated analog as the $H_2$ or $D_2$ source, an oxidizer selected from $LiNO_3$ and $KNO_3$, and a binder of polytetrafluoroethylene is a thermally stable gas generator composition which yields greater than 12.5 weight percent $H_2$ or $D_2$. The MBDA weight percentages by weight ranges from 80–90, the oxidizer ranges from 5–15, and the binder ranges from 2–15.

3 Claims, 6 Drawing Figures

SOLID H₂/D₂ GAS GENERATORS

DEDICATORY CLAUSE

The invention described herein was made in the course of or under a contract or subcontract thereunder with the Government and may be manufactured, used, and licensed by or for the Government for governmental purposes without the payment to us of any royalties thereon

BACKGROUND OF THE INVENTION

The development of hydrogen and/or deuterium generation sources for laser fuels has obviated the need for high pressure storage facilities under cryogenic conditions.

After the development of hydrogen and/or deuterium generation sources for high purity laser fuels, the needs were recognized for additional improvements such as chemical reactants capable of generating hydrogen or deuterium in higher yield and with higher purity as evidenced by the evolution of the art described below.

Compositions which generate hydrogen are disclosed in U.S. Pat. No. 3,666,672, "Hydrogen Generating Compositions", by Ralph H. Hiltz. Disclosed is an autogeneously combustible composition that liberates hydrogen on burning The composition contains an alkali metal borohydride and a hydrazine sulfate in proportions such that there are between about 0.5 to 2 boron atoms for each nitrogen atom.

Another example of a prior art source for hydrogen generation is disclosed by Huskins et al in U.S. Pat. No. 3,940,474 wherein unsolvated aluminum hydride is decomposed by a heat source (e.g., a wire of about 80% nickel and 20% chromium with a predetermined diameter which is positioned in contact with the unsolvated aluminum hydride, and provided with a means for electrically heating the hydride to a decomposition temperature range from about 180° C. to about 185° C.) to provide hydrogen gas at a lower temperature.

Examples of prior art compositions for producing hydrogen or deuterium at about 600° C.–700° C. are disclosed by Ayers et al in U.S. Pat. No. 3,948,699. These compositions are based on complex metal boron compounds of the general formula $M(BH_4)_x$ or $M(BD_4)_x$, (wherein M equals a metal and x equals the valence of the metal M; M is an alkali metal or an alkali earth metal; H is hydrogen, and D is deuterium) and metal oxides of the general formula $Q_2O_3$ (wherein Q is a trivalent metal selected from iron, aluminum, gallium, cobalt, and indium) combined stoichiometrically.

Higher temperature hydrogen or deuterium (e.g., about 3000° C.) production is disclosed by Ayers et al in U.S. Pat. No. 3,948,700. This patent discloses a storable solid propellant composition based on unsolvated aluminum hydride and ferric oxide which produces high temperature gases from a self-sustaining reaction, once started, by a heat source such as an electrically heated nickel-chromium ignition wire. The hydrogen or deuterium produced is acceptable for use in HF/DF and HCl chemical lasers, the gas dynamic laser (GDL), or a source of hot gases for reducing fuel.

Additional prior art is disclosed by Chew et al in U.S. Pat. No. 4,061,512 which relates to storable solid propellant compositions based on complex metal boron compounds of the general formula $M(BH_4)_x$ or $M(BD_4)_x$ (wherein M equals a metal and x equals the valence of the metal M; M is an alkaline metal or an alkaline earth metal; H is hydrogen, and D is deuterium) and ammonium salts of the general formula $(NH_4)_nY$ or deuteroammonium salts of the general formula $(ND_4)_nY$ (wherein Y represents an anion with a total charge of n; N is nitrogen, H is hydrogen and D is deuterium. The specified compounds combined stoichiometrically or in varying molar ratios produce hydrogen or deuterium that contains nitrogen as an inert diluent which is acceptable for use in HF/DF chemical lasers, the gas dynamic laser GDL, or as a source of hydrogen containing an inert diluent.

In recent disclosures by Chew et al in U.S. Pat. No. 4,157,927, a class of compounds known as amine boranes and their derivatives are mixed with heat producing compounds such as lithium aluminum hydride or a mixture, such as $NaBH_4/Fe_2O_3$ mixtures combined in definite proportions in a mixer or ball mill to produce a uniformly mixed powder. The mixed powder is then pressed into pellets and ignited to produce the hydrogen or deuterium as well as byproducts that are non-deactivating diluents. The oxide/borohydride or oxide/aluminohydride combination provides the thermal energy for decomposition of the amine borane.

In the further advancement of hydrogen and/or deuterium generation sources Grant et al in U.S. Pat. No. 4,381,206 disclosed an all amine borane gas generating system which consists of hydrazine bis-borane or its deuterated derivative in the form of a compacted solid propellant pellet which serves as the thermal stimulus for the decomposition of itself. An all amine borane gas generating system which additionally consists of diborane diammoniate or its deuterated derivative provides a higher yield of hydrogen or deuterium with a higher purity from a self-sustaining reaction after the self-sustaining reaction is initiated by a heat source (e.g., an electrically heated nichrome wire) sufficient to initiate the reaction. This all amine borane gas generating system which consists of $N_2H_4.2BH_3$ and $H_2B(NH_3)_2BH_4$ is in the form of a compacted solid propellant pellet. The pellets are formed to the desired configuration employing pressures from about 500 to about 10,000 pounds total load. The solid propellant pellets are useful as a $H_2$ or $D_2$ generation sources for fuels for lasers.

Gas generator formulations of the prior art have provided yields in the range of 16 weight percent and exceeding 99 percent purity; however, because of inadequate thermal stability for Army field application, a lower yield such as exceeding 12.5 weight percent with improved thermal stabilities are proper trade-off considerations.

Therefore, an object of this invention is to provide thermally stable, solid reactant hydrogen and/or deuterium gas generator formulations which yield greater than 12.5 weight percent $H_2$ or $D_2$.

Another object of this invention is to provide a gas generator formulation which can be formed into reactant pellets having good physical properties in addition to having good thermal stability properties for field applications.

SUMMARY OF THE INVENTION

Solid reactant hydrogen and deuterium gas generator formulations which yield greater than 12.5 weight percent hydrogen or deuterium and which have excellent thermal stability at 75° C. are based on magnesium borohydride diammoniate (MBDA) as the hydrogen source, an oxidizer compound selected from LiNO3 and KNO3 and polytetrafluoroethylene (Teflon) as the binder. Formulations based on weight percentages of MBDA 80-90, LiNO3 5-15, Teflon 2-15, and KNO3 5-15 were evaluated and were found to yield high yields of hydrogen. A preferred combination with respect to boh H2 yields and reactant pellet physical properties contains 85 weight percent, MBDA, 7.5 weight percent LiNO3, and 7.5 weight percent Teflon.

DESCRIPTION OF THE PREFERRED EMBODIMENT

Figure 1:
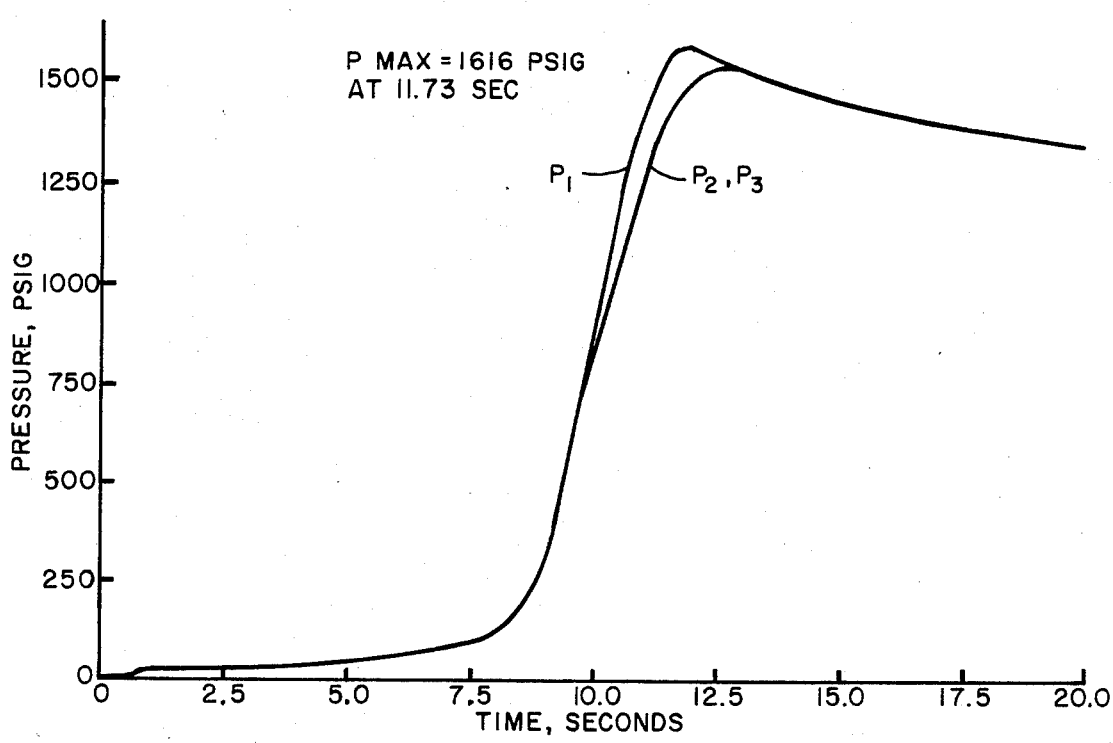
FIG. 1-4 of the drawing depict pressure versus time data for 600 grams tests of gas generator compositions containing 85 weight percent MBDA, 7.5 weight percent LiNO3, and 7.5 weight percent Teflon.

A gas generator composition comprising magnesium borohydride diammoniate (MBDA) or the deuterated equivalent in an amount of 85 weight percent, a LiNO3 oxidizer in an amount of 7.5 weight percent, and a binder of polytetrafluoroethylene in an amount of 7.5 weight percent shows excellent thermal stability at 75° C. while providing hydrogen or deuterium yields exceeding 12.5 weight percent from a reactant pellet having excellent physical properties.

The MBDA employed in this invention is prepared by either of two synthetic routes as follows:

Route I

  (1)

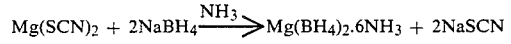  (2)

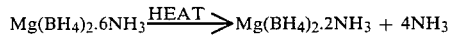  (3)

Route II

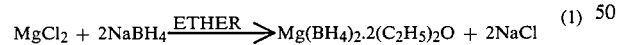  (1)

  (2)

$$Mg(BH_4)_2.2NH_3 + 2(C_2H_5)_2O$$

The second route gave better yields and a better product than the first. Using the second route, product yields were 59 to 65 weight percent for Step (1), based upon $BH_4^-$ analyses, and 93 to 99 weight percent conversion of the dietherate to the diammoniate in Step (2).

Because of thermal instability of some of the prior art compounds, it is recognized that pertinent data on MBDA and other compounds used in the H2 gas generators of this invention need to be evaluated. The results of thermochemical data for pertinent ingredients are set forth in Table I.

TABLE I

Thermochemical Data on Ingredients Used in H2 Gas Generators

| Compound and Formula | Code | $T_CK$ | H2 Content, Weight Percent | Principal Solid Products | $\Delta H_f$ KCAL/ MOLE |
|---|---|---|---|---|---|
| Magnesium Borohydride Diammoniate $Mg(BH_4)_2.2NH_3$ | MBDA | 942 | 16.03 | Mg BN | −71 |
| Ammonium Nitrate $NH_4NO_3$ | AN | ND | 5.04 | | −87.23 |
| Lithium Nitrate $LiNO_3$ | LN | ND | 0 | | −115.28 |
| Potassium Nitrate $KNO_3$ | KN | ND | 0 | | −117.76 |
| Teflon $(CF_2)_n$ | TEF | ND | 0 | C | −195.2 |

Theoretical thermochemical data for candidate H2 gas generator formulations based on compounds noted in Table I are set forth in Table II.

TABLE II

Theoretical Thermochemical Data on Candidate Formulations

| | Reactants, Weight Percent | | | |
|---|---|---|---|---|
| MBDA | 85.0 | 85.0 | 85.0 | 85.0 |
| LiNO3 | 15.0 | 10.0 | 5.0 | 7.5 |
| Teflon | — | 5.0 | 10.0 | 7.5 |
| | Principal Products Weight Percent | | | |
| GASES | | | | |
| H2 | 12.51 | 13.21 | 12.81 | 13.01 |
| CH4 | — | 1.60 | 3.20 | 2.40 |
| N2 | 1.38 | 2.00 | 1.00 | 1.50 |
| CO | — | — | — | — |
| SOLIDS | | | | |
| BN | 47.81 | 47.81 | 47.81 | 47.81 |
| B2O3 | — | — | — | — |
| Mg OR B | 3.01 | 6.43 | 7.56 | 13.19 |
| $M_xO_y$ | 26.31 | 17.54 | 8.77 | 13.16 |
| $M_xF_y$ | | | | 8.74 |
| Theo $T_F$, K | 1701 | 1556 | 1534 | 1538 |

Experimental Data Small Scale Tests

The MBDA synthesized by route 2 above was used in preparing the candidate formulations noted in Table II. Smallscale (<10 gram) tests were conducted on pressed, 0.5-inch diameter pellets of these formulations in a Parr calorimeter bomb hardware employing a nichrome ignition wire. Data derived from these tests indicated:

1 NH4NO3 was not a suitable oxidizer because its acidic character introduces thermal instability.

2. LiNO3 was the best oxidizer evaluated.

3. A binder was needed to improve the physical properties of pressed pellets; Teflon was selected as the most expeditious candidate.

Additional thermal stabilities of the candidate formulations were determined, as quickly as possible, to ensure adequate stability for field use. Data derived from these tests are presented in Table III.

TABLE III

Thermal Stability of MBDA-Based Formulations

| Formulation w/o | No of Days/Temperature, C. | Weight Loss (−) % | Pellet Appearance |
|---|---|---|---|
| Neat MBDA | 155/75 | −0.10 | Unchanged |
| 90MBDA/10LiNO₃ | 148/75 | −0.82 | Unchanged |
| 87.5MBDA/12.5LiNO₃ | 149/75 | −0.82 | Unchanged |
| 85MBDA/15LiNO₃ | 112/75 | −0.62 | Unchanged |
| 85MBDA/15KNO₃ | 112/75 | −0.67 | Unchanged |
| 85MBDA/7.5LiNO₃/7.5KNO₃· | 101/75 | −0.81 | Unchanged |
| 85MBDA/10LiNO₃/5 Teflon | 35/75 | −0.44 | Unchanged |
| 85MBDA/7.5LiNO₃/7.5 Teflon | 35/75 | −0.51 | Unchanged |
| 85MBDA/5LiNO₃/10 Teflon | 35/75 | −0.11 | Unchanged |

Figure 5:
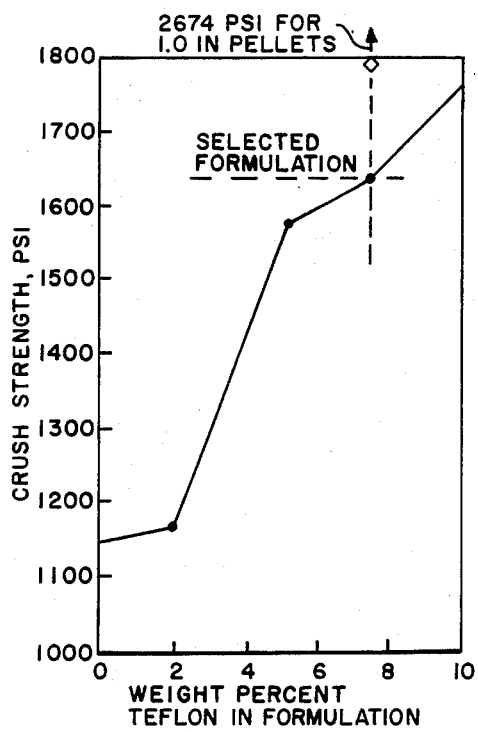
FIG. 5 depicts crush strength of a selected formualtion, MBDA/LiNO3/Teflon, in a 0.5 inch diameter pellet, versus weight percent binder, Teflon.

Crush strengths of pressed 0.5-inch diameter pellets of candidate formulations with varying amounts of Teflon are shown in FIG. 5. Data for 1-inch diameter pellets of the optimized formulation are also presented in FIG. 5.

The MBDA/LiNO$_3$/Teflon formulations were optimized by progressively test firing 100 to 600 grams of 0.5- and 1.0-inch-diameter pelletized compositions. The initial series of 100-gram gas generator tests was performed to finalize the solid reactant formulation for scaleup to the 600-gram level. While formulations containing 10 to 12 weight percent LiNO provided the best H$_2$ yields (12.3 to 12.4 weight percent) during the 100-gram tests, the pellets contained only 2 to 5 weight percent Teflon had poor crush strengths. Pellets with less than 7.5 weight percent Teflon fractured easily and their production became quite labor intensive because of the difficulties encountered in making usable pellets. Based on this processing problem and the fact that the pelletized 85 MBDA/7.5 LiNO$_3$/7.5 weight percent Teflon composition had a higher crush strength and gave H$_2$ weight percent yields >12, this formulation was selected for the 300- and 600- gram gas generating firings. The selection was adequately confirmed by the subsequent test results. Data derived from these tests are presented in Table IV. After the initial 100 gram tests (Table IV), a porous stainless steel filter was added to the test hardware for Tests 4-11 and 4-23 along with gas accumulators having a volume of 0.5 liter and 3.8 liters, respectively.

Figure 2:
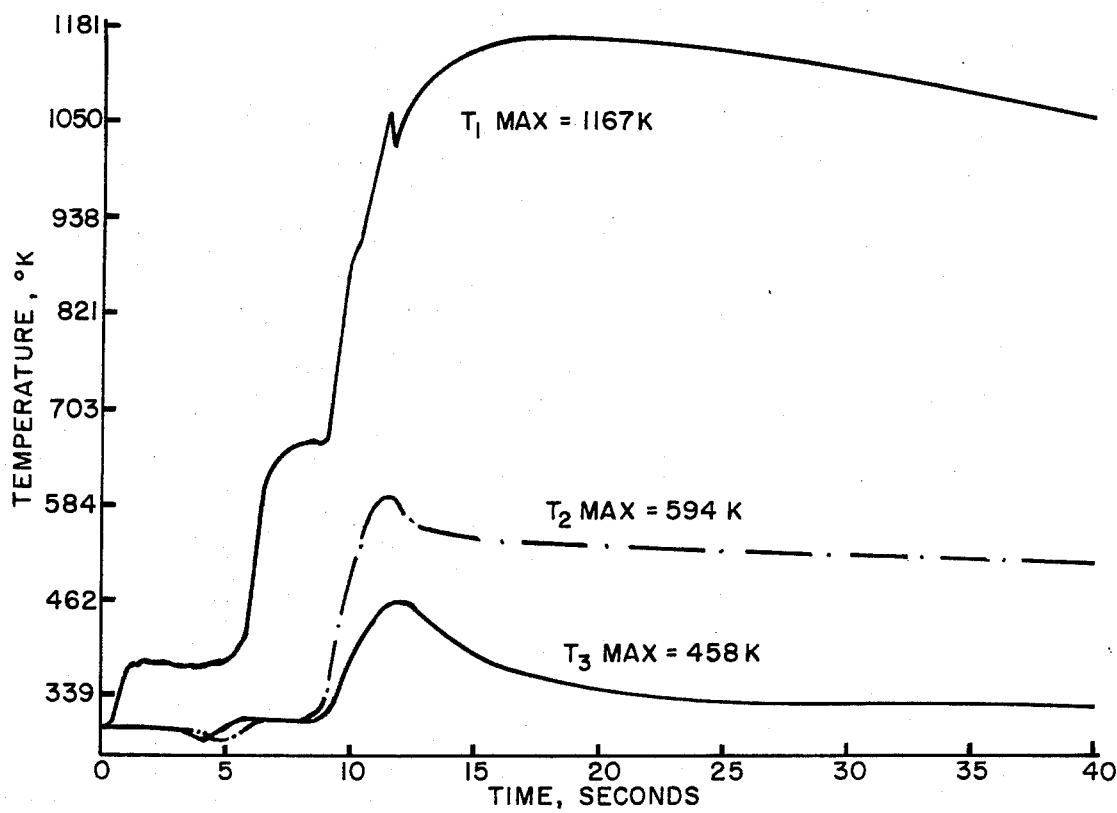
Figure 3:
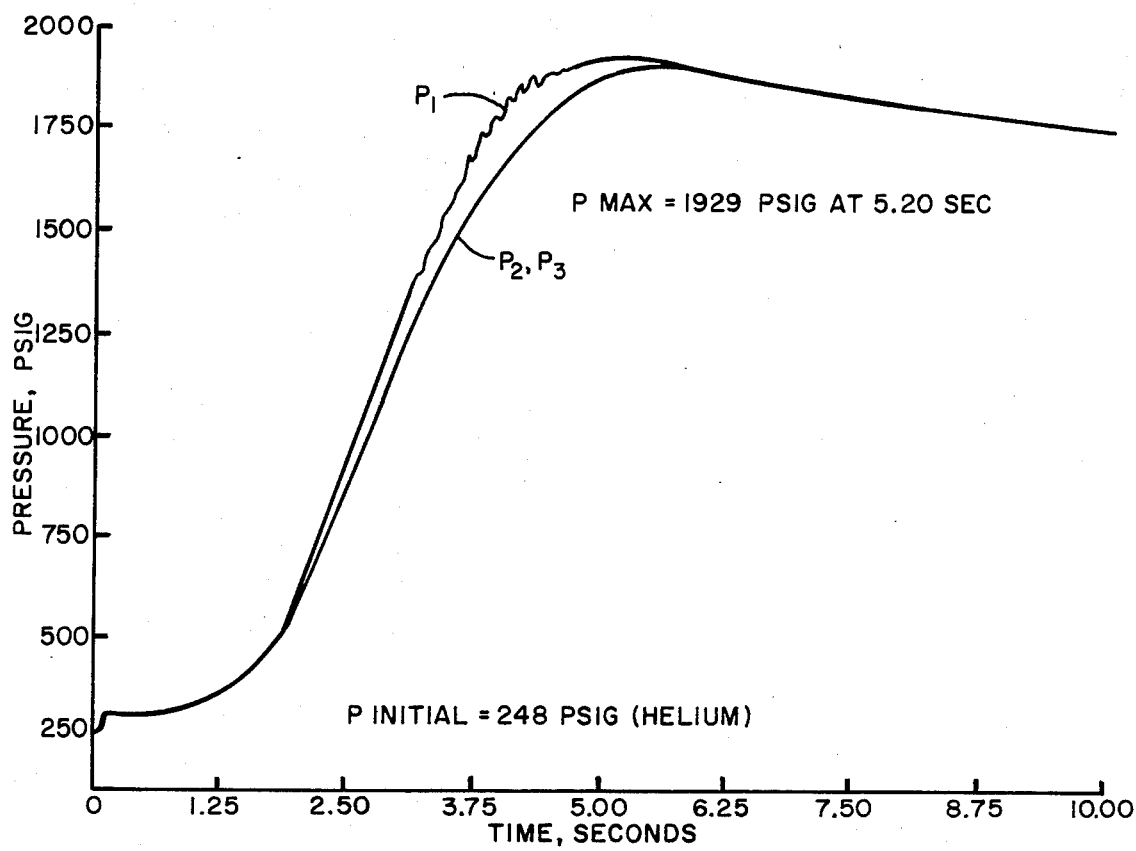
Figure 4:
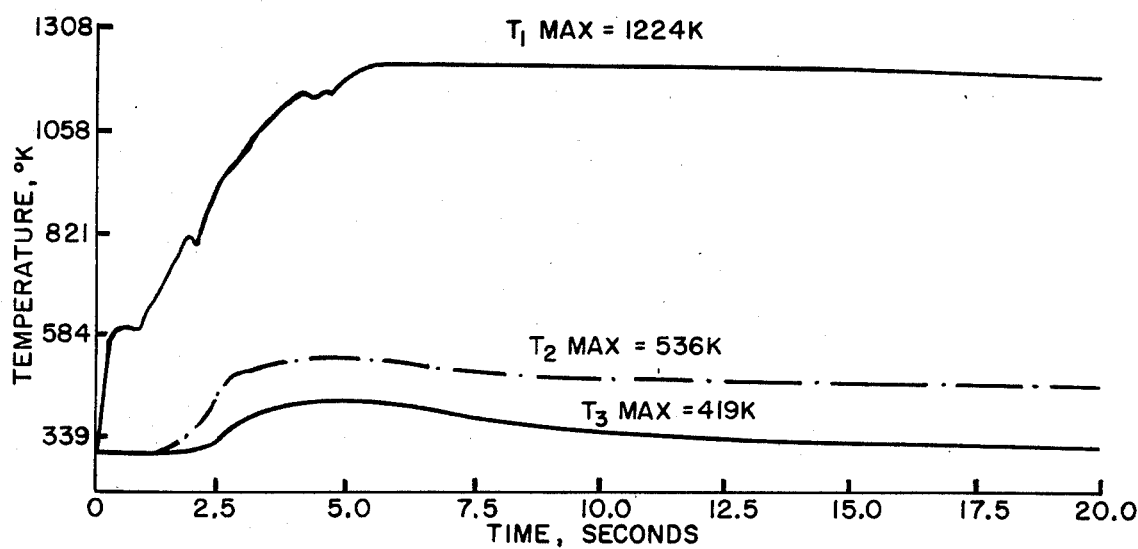
Figure 6:
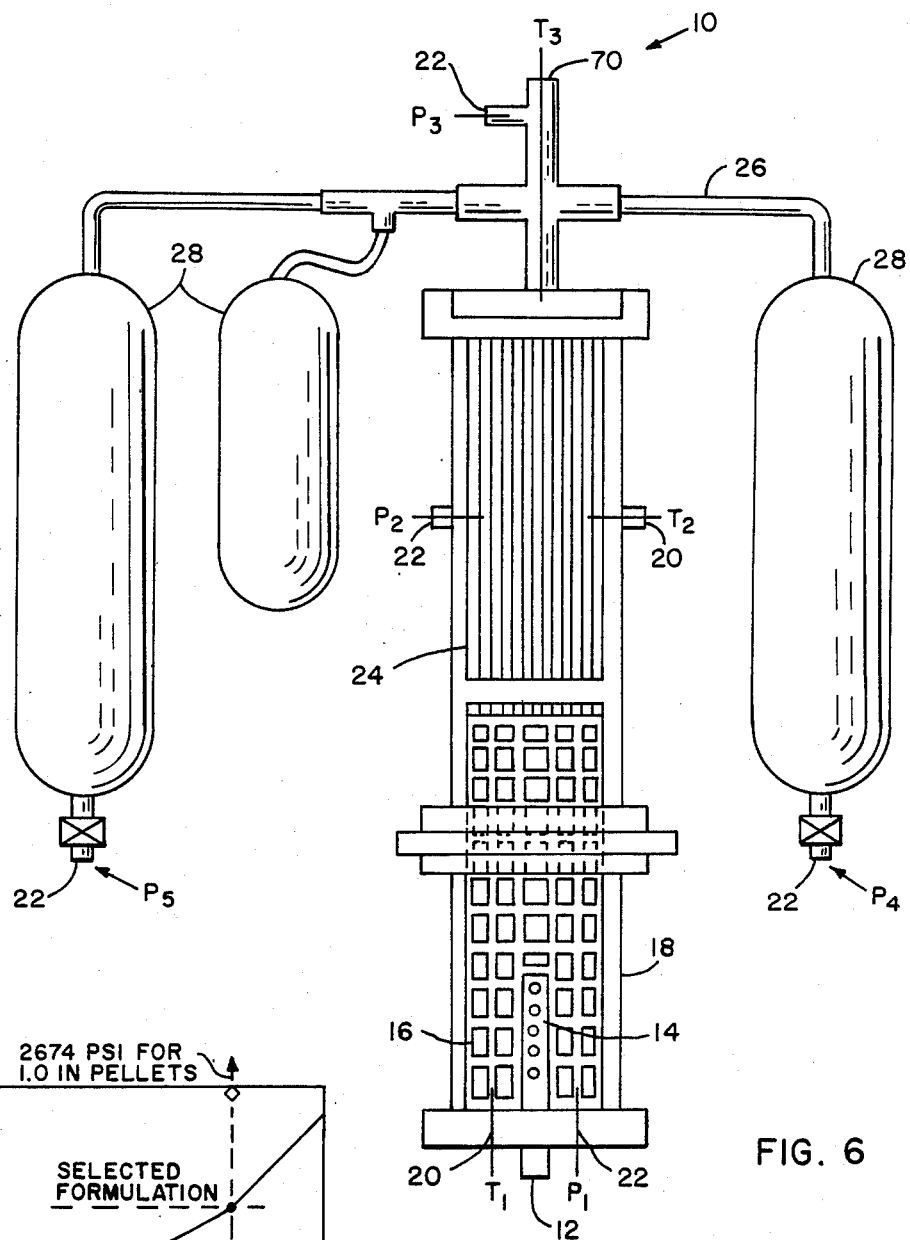
FIG. 6 is a schematic of test hardware used for the 600-gram tests.

Although a full summary of scaled up gas generator test data is provided in Table IV, only pressure versus time data for tests 5-31 and 6-5 are presented graphically in FIGS. 1 and 2 and 3 and 4 for the 600 grams tests, respectively. FIGS. 2 and 4 depict $T_1$, $T_2$, and $T_3$ maximum temperature (K) values for test ports shown on FIG. 6 near igniter 12, filter 24, and conduit means 26. FIG. 6 depicts $T_1$–$T_3$ and $P_1$–$P_5$, temperatures and pressure measuring devices, respectively for the values of temperatures shown on FIGS. 2 and 4 and the values of pressures shown on FIGS. 1 and 3 respectively.

TABLE IV

Summary of Scaled Gas Generator Tests on MBDA-Based Formulations

| Formulation, Weight Percent | 2–9[1] | 2–14[1] | 3–27[1] | 4–11[1] | 4–23[1] | 5–9[1] | 5–16[2] | 5–31[6] | 6–5[6] | 6–11[6] |
|---|---|---|---|---|---|---|---|---|---|---|
| MBDA | 85.0 | 86.0 | 85.0 | 85.0 | 85.0 | 85.0 | 85.0 | 85.0 | 85.0 | 85.0 |
| LINO₃ | 10.0 | 12.0 | 10.0 | 7.5 | 7.5 | 7.5 | 7.5 | 7.5 | 7.5 | 7.5 |
| Teflon | 5.0 | 2.0 | 5.0 | 7.5 | 7.5 | 7.5 | 7.5 | 7.5 | 7.5 | 7.5 |
| Sample Weight, G | 94.516 | 92.366 | 95.210 | 140.385 | 294.265 | 604.87 | 599.61 | 609.13 | 608.96 | 605.13 |
| Pellet density, G/CC | 0.843 | 0.849 | 0.850 | 0.862 | 0.861 | 0.860 | 0.5 IN = 0.868 pellets 1.0 IN = 0.856 pellets | 0.856 | 0.857 | 0.859 |
| Free Volume, CC | 2602 | 2608 | 2602 | 3083 | 5880 | 13,380 | 13,388 | 13,380 | 13,406 | 13,382 |
| Igniter Weight, G[3] | 7.90 | 8.07 | 7.49 | 8.55 | 7.37 | 16.50 | 17.59 | 14.54 | 19.56 | 22.94 |
| Temperature, K. | | | | | | | | | | |
| Theoretical Combustion | 1673 | 1658 | 1673 | 1538 | 1538 | 1538 | 1538 | 1538 | 1538 | 1538 |
| Maximum | 1379 | 1298 | 1285 | 1348 | 1264 | 1352 | 1232 | 1167 | 1224 | 1222 |
| Equilibrium | 290 | 290 | 297 | 290 | 301 | 303 | 295 | 300 | 294 | 296.5 |
| Pressures, psia | | | | | | | | | | |
| Maximum | 1767 | 1609 | 1672 | 1617 | 1668 | 1886 | 1628 | 1616 | 1943 | 1995[7] |
| Equilibrium | 814 | 802 | 809 | 985 | 1123 | 1063 | 1042 | 1065 | 1063[8] | 1052[8] |
| % of Theoretical[4] | 99.4 | 98.8 | 93.4 | 94.9 | 96.1 | 95.8 | 96.8 | 96.3 | 99.5 | 98.8 |
| Burn Times, | | | | | | | | | | |
| Seconds to P Max | 2.81 | 2.96 | 3.59 | 5.94 | 8.91 | 3.92 | 7.60 | 11.73 | 5.20 | 4.30 |
| To 10% P Max | 0.59 | 0.04 | 1.96 | 3.30 | 6.91 | 2.67 | 4.80 | 8.28 | 1.60 | 1.26 |
| 10 to 100 P Max | 2.22 | 2.92 | 1.63 | 2.64 | 2.00 | 1.25 | 2.80 | 3.45 | 3.60 | 3.04 |
| Burn Rate, Inch/Second | 0.113 | 0.086 | 0.153 | 0.095 | 0.125 | 0.206 | 0.181 | 0.147 | 0.141 | 0.181 |
| Average Pressure, psia | 972 | 885 | 920 | 889 | 917 | 1031 | 895 | 888 | 1069 | 1097 |
| Gas Analyses, M/O[5] | | | | | | | | | | |
| H₂ | 96.8 | 96.9 | 97.4 | 97.4 | 97.7 | 97.9 | 97.9 | 98.0 | 97.7 | 98.0 |
| N₂ | 1.8 | 2.1 | 1.5 | 1.2 | 1.3 | 1.2 | 1.2 | 1.2 | 1.6 | 1.3 |
| CH₄ | 0.8 | 0.4 | 0.6 | 0.7 | 0.7 | 0.6 | 0.6 | 0.5 | 0.6 | 0.6 |
| NH₃ | 0.1 | 0 | 0 | 0.2 | 0.1 | 0.1 | 0.1 | 0.1 | 0.1 | 0.1 |
| CO | 0.5 | 0.5 | 0.5 | 0.5 | 0.2 | 0.2 | 0.2 | 0.2 | 0.1 | 0.1 |
| H₂ Yield, W/O | 12.29 | 12.39 | 11.91 | 11.98 | 12.03 | 12.55 | 12.71 | 12.61 | 12.99 | 12.84 |
| % of Theoretical[4] | 98.9 | 97.2 | 93.5 | 95.5 | 95.9 | 97.7 | 98.7 | 97.5 | 100.4 | 99.8 |
| CH₄ Yield, W/O | 0.82 | 0.42 | 0.59 | 0.69 | 0.69 | 0.62 | 0.63 | 0.53 | 0.67 | 0.66 |
| % of Theoretical[4] | 54.5 | 69.7 | 38.2 | 30.0 | 29.7 | 26.2 | 26.5 | 22.2 | 28.0 | 27.8 |

TABLE IV-continued

Summary of Scaled Gas Generator Tests on MBDA-Based Formulations

| Formulation, Weight Percent | TEST NUMBER | | | | | | | | | |
|---|---|---|---|---|---|---|---|---|---|---|
| | 2-9[1] | 2-14[1] | 3-27[1] | 4-11[1] | 4-23[1] | 5-9[1] | 5-16[2] | 5-31[6] | 6-5[6] | 6-11[6] |
| $N_2$ Yield, W/O | 3.14 | 3.80 | 2.59 | 2.08 | 2.25 | 2.16 | 2.20 | 2.12 | 2.88 | 2.37 |
| % of Theoretical[4] | 167 | 168 | 129.5 | 141 | 152 | 146 | 148 | 142 | 193 | 160 |

[1] 0.5-Inch pellets were used
[2] Equal wts (300 grams each) of 0.5- and 1.0-inch pellets were used
[3] $TiH_2/KClO_4/KRATON$
[4] Based on thermochemical equilibrium conditions
[5] Normalized by removal of He used to flush the hardware prior to test
[6] 1.0-inch pellets were used
[7] Initial pressure of 250 psi helium
[8] $P = P_{EQL} - P_{INIT}$

Scaled Gas Generator Test Results

The hardware employed for the 600-gram tests is shown in FIG. 6. This configuration is not considered optimum for this size pellet load, but it served to demonstrate $H_2$ generation at this level.

The test results summarized in Table IV confirmed the viability of the 85 MBDA/7.5 $LiNO_3$/7.5 weight percent Teflon formulation as a high yield, $H_2$-generating solid reactant. The $H_2$ yields ranged from 11.98 to 12.99 weight percent for test firings of 140 to 609 grams of the pelletized formulation. The average purity of the $H_2$ was 98 mole percent and the principal gaseous impurities were $N_2$ (1.3 m/o), $CH_4$ (0.6 m/o) and CO (0.2 m/o); the last was an igniter combustion product.

Based upon the use of pure MBDA, thermochemical calculations predicted higher amounts of $CH_4$, but lower quantities of $N_2$, than found for this formulation. The percent of theory values for these gaseous impurities are given in Table IV. The small amount of $CH_4$ cogenerated should not present a problem related to HF/DF chemical laser usage.

Gas Analyses. Gas samples were taken from the combustion chamber and gas accumulators and analyzed. Very little difference was found in the gas composition from the two section of the gas generator. The weighted average analyses are reported in Table IV.

During further testing, a 1.9-kg batch of different lots of MBDA was blended. Analyses of this material for Mg, hydridic hydrogen, and $NH_3$ indicated it to have an average composition of $Mg_{0.98}(BH_4)_2 \cdot 1.91\ NH_3$. This material had different pelletizing properties when formulated with $LiNO_3$ and Teflon, and it was possible to produce 1.0-inch-diameter pellets from this blend. The larger diameter pellets have more desirable gassing times.

FIG. 6 depicts a schematic of test hardware for 600 gram tests. An initiator 12 of the Hivelite type is shown in communication with a Piccolo igniter tube 14 for igniting pellets 16 (0.514 inch×0.7 inch or 1.1 inches×1.2 inches) contained in combustion chamber 18. The test hardware 10 includes test ports 20 and 22 for temperature and pressure measurements respectively. $T_1$-$T_3$ maximum temperature (K) values of FIG. 4 are from temperature ports 20 near igniter 12, near filter 24, and conduit means 26 respectively. The test hardware is provided with a porous stainless steel filter 24 and conduit means 26 to direct combustion products to a plurality of gas accumulator containers 28 of variable sizes which can be removed to analyze combustion products. The test hardware provided the means for determining combustion efficiency as related to scale-up tests as further noted below.

Combustion Efficiency. The combustion efficiency and, therefore, the $H_2$ yield, progressively increased with the size of the pellet loadings. The principal reason for this observation is believed to have resulted from a decreased heat loss caused by a more favorable hardware/reactant loading mass ratio in going from the 7- to 600-gram size tests. The scaling effects observed on the $H_2$ yield, combustion efficiency, and burn rate are summarized in Table V.

The burn time for the first 600-gram test (5-9) was faster than desired. It was possible to extend the gassing time to >2 seconds by utilizing either a blend of 0.5-inch and 1.0-inch diameter pellets or the latter size pellets alone. A gassing time of >3 seconds is considered optimal for $H_2$ generation as indicated by Systems Analyses.

The increased burn time resulting from the larger pellets and the reduced ignition delay obtained by prepressurizing the gas generator can be noted by comparing the data in Table IV and V.

TABLE V

Scaling Effects on 85MBDA/7.5$LiNO_3$/7.5 Teflon Formulation

| PELLET LOADING GRAMS | COMBUSTION EFFICIENCY[1] (% OF THEORETICAL GAS YIELD) | $H_2$ YIELD W/O | BURN TIME, SECONDS (10 TO 100% $P_{MAX}$) |
|---|---|---|---|
| 7 | 94.8[2] | 11.70 | 2.98 |
| 140 | 94.8[2] | 11.98 | 2.64 |
| 300 | 96.1[2] | 12.03 | 2.00 |
| 600 | 96.5[2] | 12.55 | 1.25 |
| 600 | 97.8[3] | 12.71 | 2.80 |
| 600 | 96.3[4] | 12.61 | 3.45 |
| 600 | 98.8[4][5] | 12.92 | 3.32 |

[1] assuming pure MBDA
[2] 0.5-inch diameter pellets
[3] an equal weight mixture of 0.5- and 1.0-inch diameter pellets
[4] 1.0-inch diameter pellets
[5] system was initially pressurized to 250 psi with helium prior to ignition (average of two tests)

The $D_2$ gas generator feasibility studies were conducted utilizing deuterated analogs of $NH_3 \cdot BH_3$ and $NH_4NO_3$ in combination with boron. The resultant large scale (100 gram) test data are presented in Table V. A typical pressure versus time curve was established based on data obtained.

TABLE VI $D_2$ Gas Generator Formulations Scaled-Up Test Data

| Ingredients W/O | Test Number | | |
|---|---|---|---|
| | 10-14 | 10-28 | 11-22 |
| $ND_3BD_3$ | 70.00 | 70.00 | 70.00 |
| $ND_4NO_3$ | 19.81 | 19.81 | 19.81 |
| B | 10.19 | 10.19 | 10.19 |
| Sample Weight, G | 100 | 100 | 85 |
| Igniter Weight, G | 10 | 10 | 10 |
| Max Temperature, K | 730 | 1395 | 1443 |
| Max Pressure, psia | 1106 | 1132 | 5000 |
| Equal Pressure, psia | 585 | 812 | 1131 |
| Burn Time, Sec | 2.24 | 2.33 | 0.50 |
| Ign delay, Sec | 1.38 | 0.84 | 0.90 |
| $D_2$ Yield, W/O | 15.61 | 16.10 | 18.01 |
| $H_2$ Yield, W/O | 0.70 | 0.73 | 0.45 |
| HD Yield, W/O | 2.39 | 2.46 | 3.46 |
| Total D Yield W/O | 17.21 | 17.75 | 20.33 |
| % of Theoretical | 69.3 | 71.5 | 81.9 |

The extensive testing and evaluations of the solid $H_2/D_2$ gas generator composition of this inention establishes their viability as $H_2/D_2$ gas generators.

We claim:

1. A thermally stable, solid reactant hydrogen and deuterium gas generator compositions comprising in weight percentages as follows: an oxidizer compound selected from the group of oxidizer compounds consisting of $LiNO_3$ and $KNO_3$ from about 5 to about 15; a binder of polytetrafluoroethylene from about 2 to about 15; and magnesium borohydride diammoniate in an amount from about 80 to about 90 as a source of hydrogen gas or the equivalent weight of the deuterated analog of said magnesium borohydride diammoniate is a source of deuterium gas.

2. The thermally stable solid reactant hydrogen and deuterium gas generator compositions of claim 1 wherein said composition is comprised of said compound of $LiNO_3$ in an amount of about 7.5 weight percent; said polytetrafluoroethylene in an amount of about 7.5 weight percent; and said magnesium borohydride diammoniate n an amount of about 85 weight percent.

3. The thermally stable, reactant hydrogen and deuterium gas generator composition of claim 2 in the form of pellets and having high thermal stability as determined from a less than one percent weight loss measured after being stored for over 100 days at 75° C. with no noticeable change in appearance of said pellets.

* * * * *